(12) United States Patent
Sakurai et al.

(10) Patent No.: US 7,500,641 B2
(45) Date of Patent: Mar. 10, 2009

(54) AEROSPACE VEHICLE FLOW BODY SYSTEMS AND ASSOCIATED METHODS

(75) Inventors: Seiya Sakurai, Seattle, WA (US); James E. Finnila, Seattle, WA (US); Martin F. Stephenson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 541 days.

(21) Appl. No.: 11/200,843

(22) Filed: Aug. 10, 2005

(65) Prior Publication Data
US 2007/0034748 A1     Feb. 15, 2007

(51) Int. Cl.
*B64C 3/50* (2006.01)

(52) U.S. Cl. ..................................... 244/215
(58) Field of Classification Search .......... 244/213–217
See application file for complete search history.

(56) References Cited

U.S. PATENT DOCUMENTS

| | | | |
|---|---|---|---|
| 1,724,456 A | | 8/1929 | Crook |
| 1,770,575 A | | 7/1930 | Ksoll |
| 2,086,085 A | | 7/1937 | Lachmann et al. |
| 2,138,952 A | * | 12/1938 | Blume ........................ 244/216 |
| 2,169,416 A | | 8/1939 | Griswold |
| 2,282,516 A | | 5/1942 | Hans et al. |
| 2,289,704 A | | 7/1942 | Grant |
| 2,319,383 A | | 5/1943 | Zap |
| 2,347,230 A | | 4/1944 | Zuck |
| 2,358,985 A | | 9/1944 | McAndrew |
| 2,378,528 A | | 6/1945 | Arsandaux |
| 2,383,102 A | | 8/1945 | Zap |
| 2,385,351 A | | 9/1945 | Davidsen |
| 2,387,492 A | | 10/1945 | Blaylock et al. |
| 2,389,274 A | | 11/1945 | Pearsall et al. |

(Continued)

FOREIGN PATENT DOCUMENTS

DE            387833            1/1924

(Continued)

OTHER PUBLICATIONS

European Search Report for GB0615366.2; The Boeing Company; Nov. 20, 2006; 2 pgs.

(Continued)

*Primary Examiner*—Michael R Mansen
*Assistant Examiner*—Joseph W Sanderson
(74) *Attorney, Agent, or Firm*—Perkins Coie LLP (57) ABSTRACT

Flow body systems and associated methods, including aerospace vehicle control surface systems are disclosed herein. One aspect of the invention is directed toward an aerospace vehicle system that includes a first flow body that can be coupleable to an aerospace vehicle. The system can further included a second flow body that includes a chord line and can be rotatably coupled to the first flow body at a hinge point positioned away from the chord line. The hinge point can have a hinge axis. The hinge line can extend through the hinge point, but being nonparallel with the hinge axis. The system can still further include at least one self-aligning mechanism coupled between the first flow body and the second flow body. The at least one self-aligning mechanism can be positioned to allow the second flow body to rotate about the hinge line and the hinge axis.

22 Claims, 6 Drawing Sheets

U.S. PATENT DOCUMENTS

| | | |
|---|---|---|
| 2,406,475 A | 8/1946 | Rogers |
| 2,422,296 A | 6/1947 | Flader et al. |
| 2,444,293 A | 6/1948 | Holt |
| 2,458,900 A | 1/1949 | Erny |
| 2,504,684 A | 4/1950 | Harper |
| 2,518,854 A | 8/1950 | Badenoch |
| 2,555,862 A * | 6/1951 | Romani .................. 244/215 |
| 2,563,453 A | 8/1951 | Briend |
| 2,652,812 A | 9/1953 | Fenzl |
| 2,665,084 A | 1/1954 | Feeney et al. |
| 2,665,085 A | 1/1954 | Feeney et al. |
| 2,702,676 A * | 2/1955 | Delaney, Jr. ............ 244/210 |
| 2,743,887 A * | 5/1956 | Fiedler .................. 244/214 |
| 2,851,229 A | 9/1958 | Clark |
| 2,864,239 A | 12/1958 | Taylor |
| 2,877,968 A | 3/1959 | Granan et al. |
| 2,886,008 A | 5/1959 | Geyer et al. |
| 2,891,740 A | 6/1959 | Campbell |
| 2,892,312 A | 6/1959 | Allen et al. |
| 2,899,152 A | 8/1959 | Weiland |
| 2,912,190 A | 11/1959 | MacDonough |
| 2,920,844 A | 1/1960 | Marshall et al. |
| 2,938,680 A | 5/1960 | Lawrence et al. |
| 2,990,144 A | 6/1961 | Hougland |
| 2,990,145 A | 6/1961 | Hougland |
| 3,013,748 A | 12/1961 | Westburg |
| 3,089,666 A | 5/1963 | Quenzler |
| 3,102,607 A | 9/1963 | Roberts |
| 3,112,089 A | 11/1963 | Dornier |
| 3,136,504 A | 6/1964 | Carr |
| 3,166,271 A | 1/1965 | Zuck |
| 3,203,647 A | 8/1965 | Alvarez-Calderon |
| 3,263,946 A | 8/1966 | Roberts et al. |
| 3,282,535 A | 11/1966 | Steiner |
| 3,375,998 A | 4/1968 | Alvarez-Calderon |
| 3,423,858 A | 1/1969 | Speno |
| 3,447,763 A | 6/1969 | Allcock |
| 3,463,418 A | 8/1969 | Miksch |
| 3,486,720 A * | 12/1969 | Seglem et al. ............ 244/210 |
| 3,499,622 A | 3/1970 | Lugan et al. |
| 3,504,870 A | 4/1970 | Cole et al. |
| 3,528,632 A | 9/1970 | Miles et al. |
| 3,539,133 A | 11/1970 | Robertson |
| 3,556,439 A | 1/1971 | Autry et al. |
| 3,587,311 A | 6/1971 | Hays, Jr. |
| 3,589,648 A | 6/1971 | Gorham et al. |
| 3,642,234 A | 2/1972 | Kamber et al. |
| 3,653,611 A | 4/1972 | Trupp et al. |
| 3,655,149 A * | 4/1972 | Williams .................. 244/225 |
| 3,677,504 A | 7/1972 | Schwarzler et al. |
| 3,704,828 A | 12/1972 | Studer et al. |
| 3,704,843 A | 12/1972 | Jenny |
| 3,711,039 A | 1/1973 | James |
| 3,730,459 A | 5/1973 | Zuck |
| 3,743,219 A | 7/1973 | Gorges |
| 3,767,140 A | 10/1973 | Johnson |
| 3,776,491 A * | 12/1973 | Oulton .................... 244/213 |
| 3,794,276 A | 2/1974 | Maltby et al. |
| 3,804,267 A | 4/1974 | Cook et al. |
| 3,807,447 A | 4/1974 | Masuda et al. |
| 3,813,062 A | 5/1974 | Prather |
| 3,827,658 A | 8/1974 | Hallworth |
| 3,831,886 A | 8/1974 | Burdges et al. |
| 3,836,099 A | 9/1974 | O'Neill et al. |
| 3,837,601 A | 9/1974 | Cole |
| 3,847,369 A * | 11/1974 | Phillips et al. ............ 244/210 |
| 3,862,730 A | 1/1975 | Heiney |
| 3,874,617 A | 4/1975 | Johnson |
| 3,897,029 A | 7/1975 | Calderon et al. |
| 3,904,152 A | 9/1975 | Hill |
| 3,910,530 A | 10/1975 | James et al. |
| 3,913,450 A | 10/1975 | MacGregor |
| 3,917,192 A | 11/1975 | Alvarez-Calderon et al. |
| 3,931,374 A | 1/1976 | Moutet nee Layrisse et al. |
| 3,941,334 A | 3/1976 | Cole |
| 3,941,341 A | 3/1976 | Brogdon, Jr. |
| 3,949,957 A | 4/1976 | Portier et al. |
| 3,954,231 A * | 5/1976 | Fraser .................. 244/225 |
| 3,968,946 A | 7/1976 | Cole |
| 3,985,319 A | 10/1976 | Dean et al. |
| 3,987,983 A | 10/1976 | Cole |
| 3,991,574 A | 11/1976 | Frazier |
| 3,992,979 A | 11/1976 | Smith |
| 3,993,584 A | 11/1976 | Owen et al. |
| 3,994,451 A | 11/1976 | Cole |
| 4,011,888 A | 3/1977 | Whelchel et al. |
| 4,015,787 A | 4/1977 | Maieli et al. |
| 4,049,219 A * | 9/1977 | Dean et al. .................. 244/217 |
| 4,106,730 A | 8/1978 | Spitzer et al. |
| 4,117,996 A | 10/1978 | Sherman |
| 4,120,470 A | 10/1978 | Whitener |
| 4,131,253 A | 12/1978 | Zapel |
| 4,146,200 A | 3/1979 | Borzachillo |
| 4,171,787 A | 10/1979 | Zapel |
| 4,172,575 A | 10/1979 | Cole |
| 4,180,222 A | 12/1979 | Thornburg |
| 4,181,275 A | 1/1980 | Moelter et al. |
| 4,189,120 A | 2/1980 | Wang |
| 4,189,121 A | 2/1980 | Harper et al. |
| 4,189,122 A | 2/1980 | Miller |
| 4,200,253 A | 4/1980 | Rowarth |
| 4,202,519 A | 5/1980 | Fletcher |
| 4,240,255 A | 12/1980 | Benilan |
| 4,248,395 A | 2/1981 | Cole |
| 4,262,868 A | 4/1981 | Dean |
| 4,267,990 A | 5/1981 | Staudacher et al. |
| 4,275,942 A | 6/1981 | Steidl |
| 4,283,029 A | 8/1981 | Rudolph |
| 4,285,482 A | 8/1981 | Lewis |
| 4,293,110 A | 10/1981 | Middleton |
| 4,312,486 A | 1/1982 | McKinney |
| 4,351,502 A | 9/1982 | Statkus |
| 4,353,517 A | 10/1982 | Rudolph |
| 4,358,077 A | 11/1982 | Coronel |
| 4,360,176 A | 11/1982 | Brown |
| 4,363,098 A | 12/1982 | Buus et al. |
| 4,365,774 A | 12/1982 | Coronel |
| 4,368,937 A | 1/1983 | Palombo et al. |
| 4,384,693 A | 5/1983 | Pauly |
| 4,427,168 A | 1/1984 | McKinney |
| 4,441,675 A | 4/1984 | Boehringer |
| 4,444,368 A | 4/1984 | Andrews |
| 4,448,375 A | 5/1984 | Herndon |
| 4,459,084 A | 7/1984 | Clark |
| 4,461,449 A | 7/1984 | Turner |
| 4,470,569 A * | 9/1984 | Shaffer et al. ............ 244/214 |
| 4,471,925 A | 9/1984 | Kunz et al. |
| 4,471,927 A | 9/1984 | Rudolph |
| 4,472,780 A | 9/1984 | Chenoweth et al. |
| 4,475,702 A | 10/1984 | Cole |
| 4,479,620 A | 10/1984 | Rogers et al. |
| 4,485,992 A | 12/1984 | Rao |
| 4,496,121 A | 1/1985 | Berlin |
| 4,498,646 A | 2/1985 | Proksch |
| 4,528,775 A | 7/1985 | Einarsson et al. |
| 4,533,096 A | 8/1985 | Baker |
| 4,542,869 A | 9/1985 | Brine |
| 4,544,117 A | 10/1985 | Schuster |
| 4,553,722 A | 11/1985 | Cole |
| 4,575,030 A | 3/1986 | Gratzer |
| 4,575,099 A | 3/1986 | Nash |
| 4,576,347 A | 3/1986 | Opsahl |
| 4,605,187 A | 8/1986 | Stephenson |
| 4,618,109 A | 10/1986 | Victor |

| | | | | | | |
|---|---|---|---|---|---|---|
| 4,637,573 A | 1/1987 | Perin | | 5,875,998 A | 3/1999 | Gleine |
| 4,650,140 A | 3/1987 | Cole | | 5,915,653 A | 6/1999 | Koppelman |
| 4,669,687 A * | 6/1987 | Rudolph .................... 244/215 | | 5,921,506 A | 7/1999 | Appa |
| 4,691,879 A | 9/1987 | Greene | | 5,927,656 A | 7/1999 | Hinkleman |
| 4,700,911 A | 10/1987 | Zimmer | | 5,934,615 A | 8/1999 | Treichler |
| 4,702,441 A | 10/1987 | Wang | | 5,978,715 A | 11/1999 | Briffe |
| 4,702,442 A | 10/1987 | Weiland et al. | | 5,984,230 A | 11/1999 | Drazi |
| 4,706,913 A | 11/1987 | Cole | | 6,015,117 A | 1/2000 | Broadbent |
| 4,712,752 A | 12/1987 | Victor | | 6,033,180 A | 3/2000 | Machida et al. |
| 4,717,097 A | 1/1988 | Sepstrup | | 6,045,204 A | 4/2000 | Frazier |
| 4,720,066 A * | 1/1988 | Renken et al. .............. 244/213 | | 6,073,624 A | 6/2000 | Laurent |
| 4,729,528 A | 3/1988 | Borzachillo | | 6,076,767 A | 6/2000 | Farley et al. |
| 4,747,375 A | 5/1988 | Williams | | 6,076,776 A | 6/2000 | Breitbach |
| 4,779,822 A | 10/1988 | Burandt et al. | | 6,079,672 A | 6/2000 | Lam et al. |
| 4,784,355 A | 11/1988 | Brine | | 6,082,679 A | 7/2000 | Crouch et al. |
| 4,786,013 A | 11/1988 | Pohl | | 6,109,567 A | 8/2000 | Munoz |
| 4,796,192 A | 1/1989 | Lewis | | 6,145,791 A * | 11/2000 | Diller et al. .................. 244/215 |
| 4,823,836 A | 4/1989 | Bachmann et al. | | 6,152,405 A | 11/2000 | Muller et al. |
| 4,834,319 A | 5/1989 | Ewy et al. | | 6,161,801 A | 12/2000 | Kelm |
| 4,838,503 A | 6/1989 | Williams et al. | | 6,164,598 A | 12/2000 | Young et al. |
| 4,854,528 A | 8/1989 | Hofrichter et al. | | 6,164,599 A * | 12/2000 | Piening et al. .............. 244/215 |
| 4,856,735 A | 8/1989 | Lotz | | 6,173,924 B1 * | 1/2001 | Young et al. ................. 244/215 |
| 4,867,394 A | 9/1989 | Patterson, Jr. | | 6,189,837 B1 | 2/2001 | Matthews |
| 4,892,274 A * | 1/1990 | Pohl et al. .................... 244/213 | | 6,213,433 B1 | 4/2001 | Gruensfelder |
| 4,899,284 A | 2/1990 | Lewis | | 6,227,498 B1 | 5/2001 | Arata |
| 4,962,902 A | 10/1990 | Fortes | | 6,244,542 B1 | 6/2001 | Young et al. |
| 5,039,032 A | 8/1991 | Rudolph | | 6,293,497 B1 | 9/2001 | Kelley-Wickemeyer |
| 5,046,688 A | 9/1991 | Woods | | 6,328,265 B1 | 12/2001 | Dizdarevic |
| 5,050,081 A | 9/1991 | Abbott et al. | | 6,349,798 B1 | 2/2002 | McKay |
| 5,056,741 A | 10/1991 | Bliesner et al. | | 6,349,903 B2 * | 2/2002 | Caton et al. .................. 244/213 |
| 5,074,495 A | 12/1991 | Raymond | | 6,364,254 B1 | 4/2002 | May |
| 5,082,207 A | 1/1992 | Tulinius | | 6,375,126 B1 | 4/2002 | Sakurai |
| 5,082,208 A | 1/1992 | Matich | | 6,382,566 B1 * | 5/2002 | Ferrel et al. .................. 244/215 |
| 5,088,665 A | 2/1992 | Vijgen | | 6,431,498 B1 | 8/2002 | Watts et al. |
| 5,094,411 A | 3/1992 | Rao | | 6,439,512 B1 | 8/2002 | Hart |
| 5,094,412 A | 3/1992 | Narramore | | 6,443,394 B1 | 9/2002 | Weisend |
| 5,098,043 A | 3/1992 | Arena | | 6,450,457 B1 | 9/2002 | Sharp et al. |
| 5,100,082 A | 3/1992 | Archung | | 6,464,175 B2 | 10/2002 | Yada et al. |
| 5,114,100 A | 5/1992 | Rudolph | | 6,466,141 B1 * | 10/2002 | McKay et al. ............... 340/963 |
| 5,129,597 A | 7/1992 | Manthey | | 6,478,541 B1 | 11/2002 | Charles et al. |
| 5,158,252 A | 10/1992 | Sakurai | | 6,481,667 B1 | 11/2002 | Ho |
| 5,167,383 A | 12/1992 | Nozaki | | 6,484,969 B2 | 11/2002 | Sprenger |
| 5,203,619 A | 4/1993 | Welsch | | 6,499,577 B2 | 12/2002 | Kitamoto et al. |
| 5,207,400 A | 5/1993 | Jennings | | 6,513,761 B2 * | 2/2003 | Huenecke ................. 244/199.1 |
| 5,222,692 A | 6/1993 | Glowacki et al. | | 6,536,714 B2 | 3/2003 | Gleine et al. |
| 5,244,269 A | 9/1993 | Harriehausen | | 6,547,183 B2 | 4/2003 | Farnsworth |
| 5,259,293 A | 11/1993 | Brunner | | 6,554,229 B1 | 4/2003 | Lam |
| 5,280,863 A | 1/1994 | Schmittle | | 6,561,463 B1 | 5/2003 | Yount et al. |
| 5,282,591 A | 2/1994 | Walters et al. | | 6,568,189 B2 | 5/2003 | Blot-Carretero et al. |
| 5,310,387 A | 5/1994 | Savagian | | 6,591,169 B2 | 7/2003 | Jones |
| 5,351,914 A | 10/1994 | Nagao | | 6,598,829 B2 | 7/2003 | Kamstra |
| 5,388,788 A | 2/1995 | Rudolph | | 6,598,834 B2 | 7/2003 | Nettle |
| 5,420,582 A | 5/1995 | Kubbat | | 6,601,801 B1 | 8/2003 | Prow |
| 5,441,218 A | 8/1995 | Mueller | | 6,622,972 B2 | 9/2003 | Urnes |
| 5,474,265 A | 12/1995 | Capbern | | 6,622,974 B1 | 9/2003 | Dockter et al. |
| 5,493,497 A | 2/1996 | Buus | | 6,625,982 B2 | 9/2003 | Van Den Bossche |
| 5,535,852 A | 7/1996 | Bishop | | 6,644,599 B2 | 11/2003 | Perez |
| 5,542,684 A | 8/1996 | Squirrell et al. | | 6,651,930 B1 | 11/2003 | Gautier et al. |
| 5,544,847 A | 8/1996 | Bliesner | | 6,698,523 B2 | 3/2004 | Barber |
| 5,564,655 A | 10/1996 | Garland et al. | | 6,729,583 B2 | 5/2004 | Milliere et al. |
| 5,600,220 A | 2/1997 | Thoraval | | 6,745,113 B2 | 6/2004 | Griffen |
| 5,609,020 A | 3/1997 | Jackson | | 6,755,375 B2 | 6/2004 | Trikha |
| 5,628,477 A * | 5/1997 | Caferro et al. .............. 244/214 | | 6,796,526 B2 | 9/2004 | Boehringer |
| 5,680,124 A | 10/1997 | Bedell | | 6,796,534 B2 | 9/2004 | Beyer et al. |
| 5,681,014 A | 10/1997 | Palmer | | 6,799,739 B2 | 10/2004 | Jones |
| 5,686,907 A | 11/1997 | Bedell | | 6,802,475 B2 | 10/2004 | Davies et al. |
| 5,711,496 A | 1/1998 | Nusbaum | | 6,824,099 B1 | 11/2004 | Jones |
| 5,735,485 A | 4/1998 | Ciprian et al. | | 6,843,452 B1 | 1/2005 | Vassberg et al. |
| 5,740,991 A | 4/1998 | Gleine et al. | | 6,860,452 B2 | 3/2005 | Bacon et al. |
| 5,743,490 A | 4/1998 | Gillingham | | 6,910,659 B2 | 6/2005 | Friddell et al. |
| 5,788,190 A | 8/1998 | Siers | | 7,226,020 B2 | 7/2005 | Pohl et al |
| 5,836,550 A | 11/1998 | Paez | | 6,978,971 B1 | 12/2005 | Dun |
| 5,839,698 A | 11/1998 | Moppert | | 6,981,676 B2 | 1/2006 | Milliere et al. |

| | | | |
|---|---|---|---|
| 7,007,889 | B2 | 3/2006 | Charron |
| 7,007,897 | B2 | 3/2006 | Wingett et al. |
| 7,028,948 | B2 | 4/2006 | Pitt |
| 7,048,234 | B2 | 5/2006 | Recksiek et al. |
| 7,051,975 | B2 | 5/2006 | Pohl et al. |
| 7,051,982 | B1 | 5/2006 | Johnson |
| 7,147,241 | B2 | 12/2006 | Beaujot et al. |
| 7,243,881 | B2 | 7/2007 | Sakurai et al. |
| 7,258,308 | B2 * | 8/2007 | Beyer et al. .......... 244/216 |
| 2003/0058134 | A1 | 3/2003 | Sherry |
| 2003/0132860 | A1 | 7/2003 | Feyereisen |
| 2003/0197097 | A1 | 10/2003 | Wakayama |
| 2004/0004162 | A1 | 1/2004 | Beyer |
| 2004/0059474 | A1 | 3/2004 | Boorman |
| 2004/0195464 | A1 | 10/2004 | Vassberg et al. |
| 2004/0245386 | A1 | 12/2004 | Huynh |
| 2005/0011994 | A1 | 1/2005 | Sakurai et al. |
| 2005/0017126 | A1 | 1/2005 | McLean et al. |
| 2005/0109876 | A1 | 5/2005 | Jones |
| 2005/0242234 | A1 | 11/2005 | Mahmulyin |
| 2006/0038086 | A1 | 2/2006 | Reckzeh |
| 2006/0145028 | A1 * | 7/2006 | Richter et al. .......... 244/216 |
| 2006/0169847 | A1 | 8/2006 | Konings |
| 2006/0226297 | A1 | 10/2006 | Perez-Sanchez |
| 2006/0245882 | A1 | 11/2006 | Khan et al. |
| 2007/0252040 | A1 | 11/2007 | Kordel et al. |

FOREIGN PATENT DOCUMENTS

| | | |
|---|---|---|
| DE | 1129379 | 5/1962 |
| EP | 0100775 | 2/1984 |
| EP | 0103038 | 3/1984 |
| EP | 0781704 | 10/1985 |
| EP | 0215211 | 3/1987 |
| EP | 0483504 | 5/1992 |
| EP | 0947421 | 10/1999 |
| EP | 1010616 | 6/2000 |
| EP | 1338506 | 8/2003 |
| EP | 1462361 | 9/2004 |
| EP | 1547917 | 6/2005 |
| FR | 705155 | 6/1931 |
| FR | 984443 | 7/1951 |
| FR | 56121 | 9/1952 |
| FR | 57988 | 9/1953 |
| FR | 58273 | 11/1953 |
| GB | 645770 | 11/1950 |
| GB | 1181991 | 2/1970 |
| GB | 2144688 A | 3/1985 |

OTHER PUBLICATIONS

U.S. Appl. No. 60/475,828, Beyer.
U.S. Appl. No. 10/671,435, Robert Kelley-Wickemeyer.
U.S. Appl. No. 10/746,883, Boorman.
U.S. Appl. No. 10/746,912, Boorman.
U.S. Appl. No. 10/770,256, Speer.
U.S. Appl. No. 10/787,644, Tafs et al.
U.S. Appl. No. 10/789,100, Lacy et al.
U.S. Appl. No. 10/798,749, Sandell et al.
U.S. Appl. No. 10/814,369, Chen et al.
U.S. Appl. No. 10/814,494, Gunn et al.
U.S. Appl. No. 10/815,034, Crane et al.
U.S. Appl. No. 10/868,234, Rampton et al.
U.S. Appl. No. 10/868,238, Dun.
U.S. Appl. No. 10/935,846, Good et al.
U.S. Appl. No. 10/955,686, Wheaton et al.
U.S. Appl. No. 10/959,629, Jones.
U.S. Appl. No. 11/048,320, Konings.
U.S. Appl. No. 11/051,738, Huynh et al.
U.S. Appl. No. 11/116,905, Good et al.
U.S. Appl. No. 11/134,019, Voogt.
U.S. Appl. No. 11/284,113, Lacy et al.
U.S. Appl. No. 11/284,247, Lacy et al.
777 High Lift System, 777 Maintenance Manual, Publication Date: Circa 1994 (1 page).
777 Transmission—Typical, 777 Maintenance Manual, Publication Date: Circa 1994 (1 page).
A320 Hinterkantem-Klappen-Verstell System, Trailing Edge Flap System, SAE Presentation, Publication Date: Circa 1990 (1 page).
A340 Flight Controls, SAE Presentation, Publication Date: Circa 1995 (1 page).
Airframe Structural Design, Chen-Yeun Niu, Conmilit Press, 1988 (1 page).
Flap Drive System, 777 Maintenance Manual, Publication Date: Circa 1994 (1 page).
Flap Transmission and Support, 777 Maintenance Manual, Publication Date: Circa 1994 (1 page).
"Adaptive Aircraft: No Flight of Fancy?" Research into using exotic means of making wings change shpe in-flight looks promising, though still a long way from reality, Business Week Online, Jan. 7, 2003, pp. 1-3.
"Aero-Space Research & Technology," Space Systems, Sep. 1, 2001, pp. 1-28.
Boeing, 777 Aircraft Maintenance Manual, Sep. 5, 2002 (p. 39).
Drela, Mark, "Design and Optimization Method for Multi-Element Airfoils," MIT Department of Aeronautics and Astronautics, Copyright 1993 American Institute of Aeronautics and Astronautics, Inc. (pp. 1-11).
Drela, M., "Optimization Techniques In Airfoil Design," MIT Aero & Astro, 30 pages.
European Search Report for European Patent Application No. EP 03 07 7840, The Boeing Company, Nov. 4, 2003 (2 pgs).
Hansen, H., "Application of Mini-Trailing-Edge Devices in the Awiator Project," Airbus Deutschland, EGAG, Hunefeldstr. 1-5, D-28199 Bremen, Germany, 9 pages.
The High Speed Frontier, Chapter 2: The High-Speed Airfoil Program, "Supercritical" Airfoils, 1957-1978 (4 pages); http://www.hq.nasa.gov/office/pao/History/SP-445/ch2-5.
International Search Report, PCT/US03/19724/ Sep. 11, 2003, 5 pages.
Junkers JU 52/3M (2 pages); http://www.wpafb.af.mil/museum/outdoor/od16;[Accessed Aug. 7, 2003].
MOOG, Component Maintenance Manual, May 1994 (2 pages).
"Morphing Aircraft Structures,"—Raytheon, www.defense-update.com, pp. 1-3.
"Morphing aircraft Structure,"—Penn State University, www.personal.psu.edu/users/d/s/dsr134/mas/Cellular.htm, pp. 1-3.
www.crgrp.net, "Morphing Aerostructure—an Overview," pp. 1-9.
Petrov, A.V., "Certain Types of Separated Flow over Slotted Wings," Fluid Mechanics—Soviet Research, vol. 7, No. 5, Sep.-Oct. 1978, p. 80-89.
TU 1-44 Canard, 1 pg, date unknown.
Whitcomb, Richard T., "Review of NASA Supercritical Airfoils," National Aeornautics and Space Administration, Aug. 1974 (pp. 8-18).
"777 Maintenance Manual—Flap Drive System," Published circa 1994, p. 1.
"777 Maintenance Manual—Flap Transmission and Support," Published circa 1994, p. 1.
"Leaf Spring Retainer Seals," EMP, Inc., <http://www.epm.com/leaf_spring.htm> [accessed Apr. 27, 2005], pp. 1-2.
"Slats" Wikipedia, The Free Encyclopedia, Jun. 27, 2006, 12:23:00 revision, <http://wn.wikipedia.org/w/index.php?title=Slats&oldid=60827639> [accessed Aug. 5, 2006], pp. 1-2.
Rea, Jon, "Boeing 777 High Lift Control System," Boeing Commercial Airplane Group, IEEE AES Systems Magazine, August 1993, pp. 15-21.
"Flap (aircraft)", Wikipedia, The Free Encyclopedia, Jul. 20, 2006, 14:15 revision, http://en.wikipedia.org/w/index.php?title=Flap_%28aircraft%29&oldid=67413665 [accessed Aug. 5, 2006] pp. 1-2.

* cited by examiner

AEROSPACE VEHICLE FLOW BODY SYSTEMS AND ASSOCIATED METHODS

TECHNICAL FIELD

Embodiments of the present invention relate flow body systems and associated methods, including aerospace vehicle control surface systems having flow bodies that rotate about a hinge line and at least one hinge axis that is non-parallel with the hinge line.

BACKGROUND

Many aircraft, including large transport category aircraft, use various types of trailing edge flaps to increase wing area and/or wing camber during low speed and/or high angle of attack operations. The increased area and/or camber can provide improved performance (e.g., increased lift). Accordingly, these flaps can improve takeoff and/or landing performance. One such flap is a dropped hinge flap. The dropped hinge flap rotates about a hinge located below the chord line of the flap. Accordingly, as the dropped hinge flap extends, it increases the camber of the wing and also moves aft in a Fowler motion. This Fowler motion can increase wing area and create a gap between a trailing edge of the wing and a leading edge of the flap. The gap can allow high energy air from the bottom of the wing to energize lower energy air flowing over the top portion of the flap.

Figure 1A:
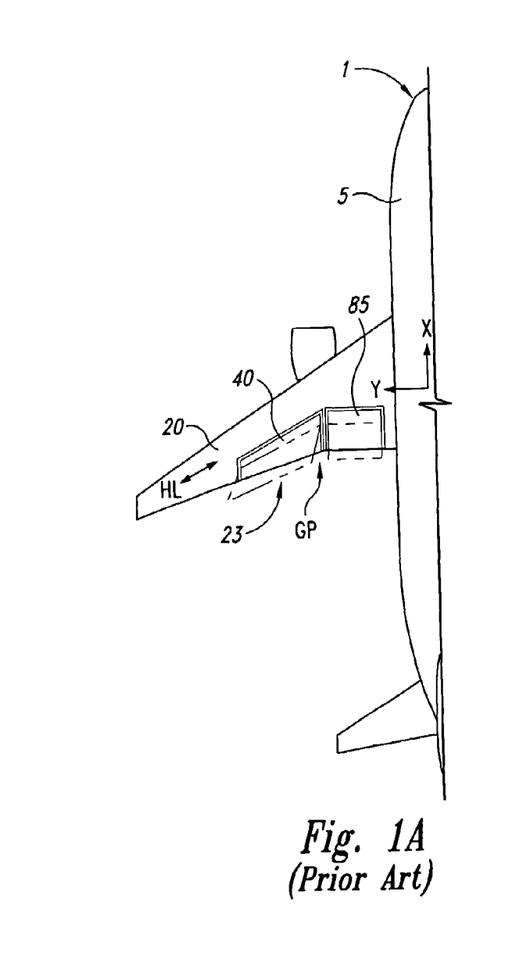
FIG. 1A is a partially schematic planform view of a portion of an aerospace vehicle having a movable flow body in accordance with the prior art.
Figure 1B:
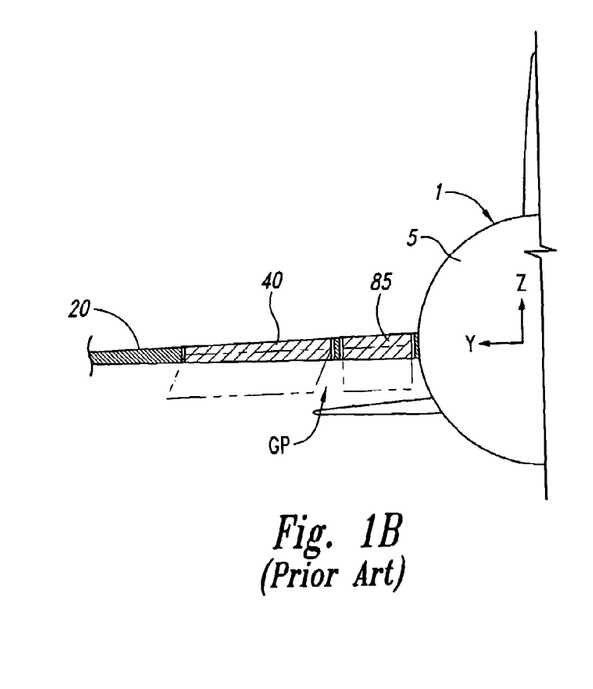
FIG. 1B is a partially schematic rear view of the portion of the aerospace vehicle shown in FIG. 1B.

FIGS. 1A and 1B are partially schematic illustrations of a dropped hinge flap 40 installed on a wing 20 of an aircraft 1. FIG. 1A is a top plan view of the flap 40, the wing 20, and a portion of a fuselage 5 of the aircraft 1. In FIG. 1A, the dropped hinge flap 40 is positioned on a portion of the wing 20 where the leading and trailing edge of the wing 20 are both swept relative to the longitudinal axis of the fuselage 5 (e.g., swept relative to the X axis). Accordingly, the flap 40 is positioned so that it rotates between a retracted position (shown in solid lines) and an extended position (shown in ghosted lines) about a hinge line HL that is also swept relative to the longitudinal axis of the fuselage 5 (e.g., the flap can travel in a somewhat cylindrical motion). However, the lateral edges of the flap 40 and the surrounding structure of the wing 20 (including the edges of other control surfaces on the wing) run parallel to the longitudinal axis of the fuselage.

Because of the swept hinge line HL, as the flap 40 moves between the retracted and the extended positions, the lateral edges of the flap rotate in a plane that is non-parallel to the longitudinal axis of the aircraft. This can cause clearance problems between the flap 40 and the surrounding structure of the wing 20. Additionally, as illustrated in both FIGS. 1A and 1B, a gap GP can be created between a laterally adjacent control surface 85 that rotates to an extended position about a hinge line that is perpendicular to the longitudinal axis of the fuselage (e.g., a hinge line that runs parallel to the Y axis). Such a gap GP can create aerodynamic inefficiencies, which in turn can reduce lift benefits provided by the flaps and/or increase drag.

SUMMARY

The present invention is directed generally toward flow body systems and associated methods, including aerospace vehicle control surface systems. Aspects of the invention are directed toward an aerospace vehicle system that includes a first flow body that can be coupleable to an aerospace vehicle. The system further includes a second flow body that has a first portion rigidly connected to a second portion. The second portion of the second flow body can be laterally disposed from the first portion of the second flow body. The first portion can have a first chord line and can be rotatably coupled to the first flow body at a first hinge point positioned away from the first chord line. The first hinge point can have a first hinge axis. The second portion can have a second chord line and can be rotatably coupled to the first flow body at a second hinge point positioned away from the second chord line. The second hinge point can have a second hinge axis. The second flow body can be rotatable about a hinge line between a first position and a second position. The hinge line can be positioned to be swept relative to a longitudinal axis of the aerospace vehicle when the first flow body is coupled to the aerospace vehicle. The hinge line can be nonparallel with the first hinge axis. The system can still further include at least one self-aligning mechanism coupled between the first flow body and the second flow body. The at least one self-aligning mechanism can be positioned to allow the second flow body to rotate about the hinge line and the first and second hinge axes.

Other aspects of the invention are directed toward an aerospace vehicle system that includes a first flow body that can be coupleable to an aerospace vehicle. The system can further included a second flow body that includes a chord line and can be rotatably coupled to the first flow body at a hinge point positioned away from the chord line. The hinge point can have a hinge axis. The second flow body can be rotatable about a hinge line between a first position and a second position. The hinge line can extend through the hinge point, but be nonparallel with the hinge axis. The system can still further include at least one self-aligning mechanism coupled between the first flow body and the second flow body. The at least one self-aligning mechanism can be positioned to allow the second flow body to rotate about the hinge line and the hinge axis.

Still other aspects of the invention are directed toward a method for making an aerospace vehicle system that includes rotatably coupling a second flow body to a first flow body at a hinge point positioned away from a chord line of the second flow body. The hinge point can have a hinge axis. The first flow body can be coupleable to an aerospace vehicle. The method can further include coupling at least one self-aligning mechanism between the first flow body and the second flow body so that the second flow body simultaneously rotates about a hinge line and the hinge axis as the second flow body moves between a first position and a second position. The hinge line can extend through the hinge point, but can be nonparallel with the hinge axis.

DETAILED DESCRIPTION

The present disclosure describes flow body systems and associated methods, including aerospace vehicle control surface systems. Several specific details of the invention are set forth in the following description and in FIGS. 2A-5 to provide a thorough understanding of certain embodiments of the invention. One skilled in the art, however, will understand that the present invention may have additional embodiments, and that other embodiments of the invention may be practiced without several of the specific features described below.

Figure 2A:
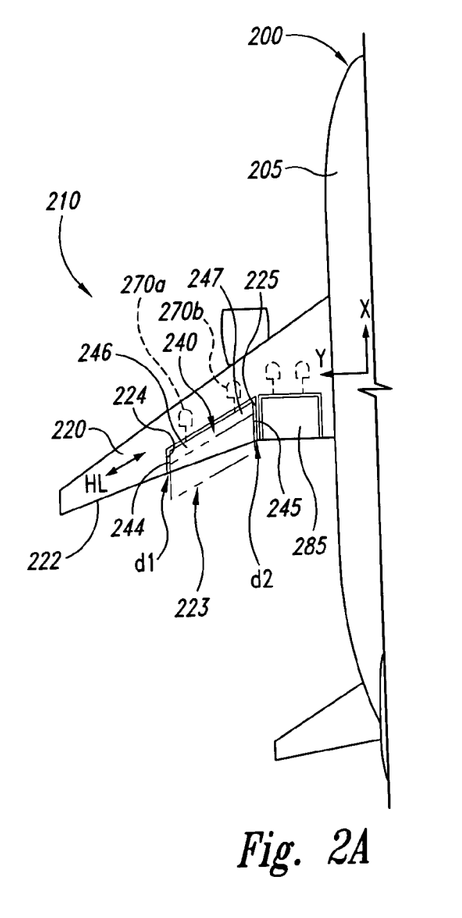
FIG. 2A is a partially schematic planform view of a portion of an aerospace vehicle having an aerospace vehicle system with a movable flow body in accordance with embodiments of the invention.
Figure 2B:
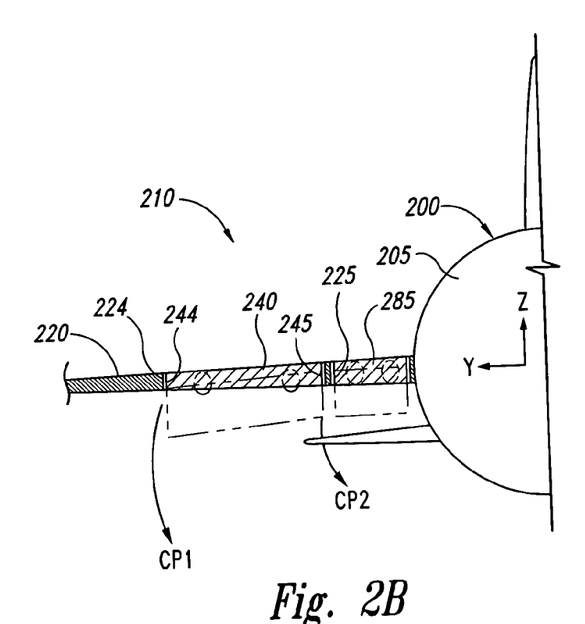
FIG. 2B is a partially schematic rear view of the portion of the aerospace vehicle shown in FIG. 2A.

FIG. 2A is a partially schematic planform view of an aerospace vehicle 200 having an aerospace vehicle system 210 with a movable flow body in accordance with embodiments of the invention. FIG. 2B is a partially schematic rear view of the portion of the aerospace vehicle 200 shown in FIG. 2A. In FIG. 2A, the aerospace vehicle 200 includes a longitudinal axis X (e.g., the longitudinal axis of a fuselage 205 of the aerospace vehicle 200). The aerospace vehicle system 210 can include a first flow body 220 and a second flow body 240 movably or rotatably coupled to the first flow body 220. In the illustrated embodiment, the first flow body 220 includes an airfoil or wing section coupled or coupleable to the fuselage 205 and the second flow body 240 can include a flap or flap section.

The second flow body can include a first portion 246 and a second portion 247 laterally disposed from the first portion 246. The first and second portions 246, 247 of the second flow body can be rigidly connected to each other (e.g., the first and second portions 246, 247 can be one piece). The first portion 246 can have a first chord line and can be rotatably coupled to the first flow body 220 at a first hinge point positioned away from the first chord line (e.g., below the first chord line). The first hinge point can have a first hinge axis that is at least approximately perpendicular to the longitudinal axis X of the aerospace vehicle 200. The second portion 247 of the second flow body 240 can have a second chord line and can be rotatably coupled to the first flow body 220 at a second hinge point positioned away from the second chord line. In certain embodiments, the second hinge axis can also be at least approximately perpendicular to the longitudinal axis X of the aerospace vehicle 200.

Additionally, at least one drive device 270 can be coupled to the second flow body 240 to move and/or rotate the second flow body 240 relative to the first flow body 220. In the illustrated embodiment, a first drive device 270a is coupled to the first portion 246 of the second flow body 240 and a second drive device 270b is coupled to the second portion 247 of the second flow body 240. In FIG. 2A, the first and second drive devices 270a, 270b provide a motion that is generally in a plane having an axis that runs at least approximately parallel to the longitudinal axis X of the aerospace vehicle 200. The drive devices can include one or more actuators and can be driven by an number of power sources, including electrical, hydraulic, and pneumatic power sources.

The second flow body 240 can be rotatable about a hinge line HL (e.g., a line through the first and second hinge points) among multiple positions. In the illustrated embodiment, the hinge line HL is swept relative to the longitudinal axis X of the aerospace vehicle 200 (e.g., non-parallel to the lateral axis Y of the aerospace vehicle 200, which is perpendicular to the longitudinal axis X) and is non-parallel with at least one of the first and second hinge axis, as discussed below in further detail with reference to FIGS. 3A-3C. In FIG. 2A, at least one self-aligning mechanism is coupled between the first flow body 220 and the second flow body 240 to allow the second flow body 240 to simultaneously rotate about the hinge line and the first and second hinge axes. Additionally, the self-aligning mechanism allows the first and second drive devices 270a, 270b, to simultaneously rotate the second flow body 240 about the hinge line and the first and second hinge axes using a drive device motion that is generally in a plane having an axis that runs at least approximately parallel to the longitudinal axis X of the aerospace vehicle 200.

In the illustrated embodiment, the first flow body 220 also includes a trailing edge 222 with a cutout that extends between a first edge 224 and a second edge 225 laterally disposed from the first edge 224. The first and second edges 224, 225 can run or extend at least approximately parallel to the longitudinal axis X of the aerospace vehicle 200. In FIG. 2A, the second flow body 240 includes a first edge 244 and a second edge 245 laterally disposed from the first edge 244 of the second flow body 240. In the illustrated embodiment, the second flow body is positioned in the cutout 223 of the first flow body 220 with the first edge 244 of the second flow body 240 being spaced apart from the first edge 224 of the first flow body 220 by a first lateral distance d1 and the second edge 245 of the second flow body 240 being spaced apart from the second edge 225 of the first flow body 220 by a second lateral distance d2. In certain embodiments, as the second flow body is rotated this feature can allow the first portion 246 of the second flow body 240 to follow a first curvilinear path CP1 (shown in FIG. 2B) and the second portion 247 of the second flow body 240 to follow a second curvilinear path CP2 (shown in FIG. 2B). In selected embodiments, the first curvilinear path CP1 can be shorter or longer than the second curvilinear path CP2 and/or can have a different radius of curvature than the second curvilinear path CP2 (e.g., the second flow body 240 can travel or rotate in a conical or somewhat conical motion). Although for the purpose of illustration the first and second curvilinear paths CP1, CP2 are shown with large differences in length and curvature, in other embodiments the differences in length and/or curvature can be small.

Because, the second flow body 240 can simultaneously rotate about the hinge line and the first and second hinge axes, as the second flow body 240 rotates relative to the first flow body 220 (e.g., between a first position and a second position), the first and second lateral distances d1, d2 can remain at least approximately unchanged. As shown in FIG. 2, this feature can reduce the clearance needed between the second flow body 240 and other structures (e.g., the first and second edges 224, 225 of the first flow body and/or other control devices 285 as compared to current dropped hinge flap systems. Additionally, this feature can reduce the gap created between adjacent control surfaces (e.g., the first flow body 240 and the other control surface control device 285 shown in FIGS. 2A and 2B), thereby increasing aerodynamic efficiency when the second flow body 240 and the other control device 285 are extended.

Figure 3A:
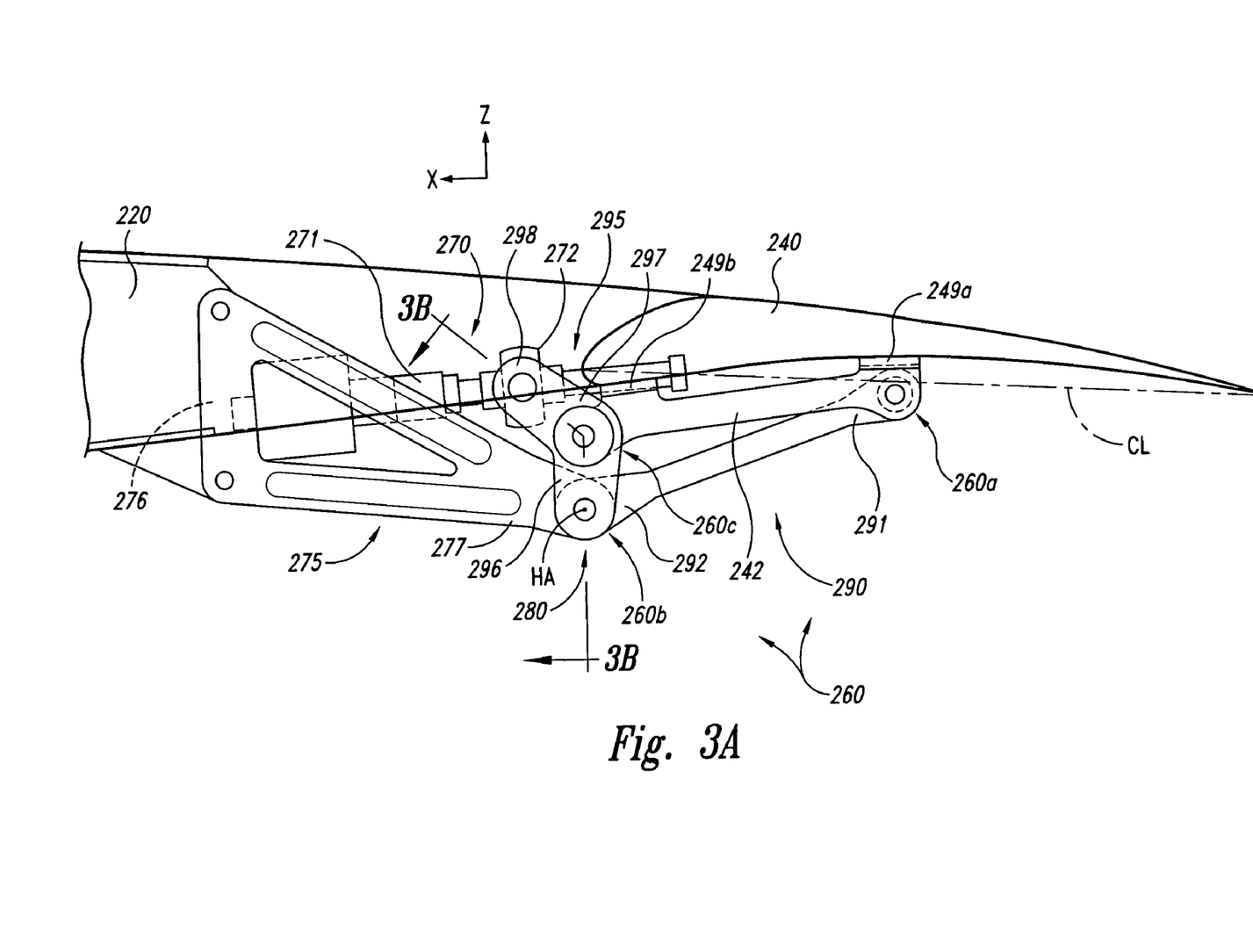
FIG. 3A is a partially schematic side cross-sectional view of a portion of the aerospace vehicle system shown in FIG. 2A-2B.
Figure 3B:
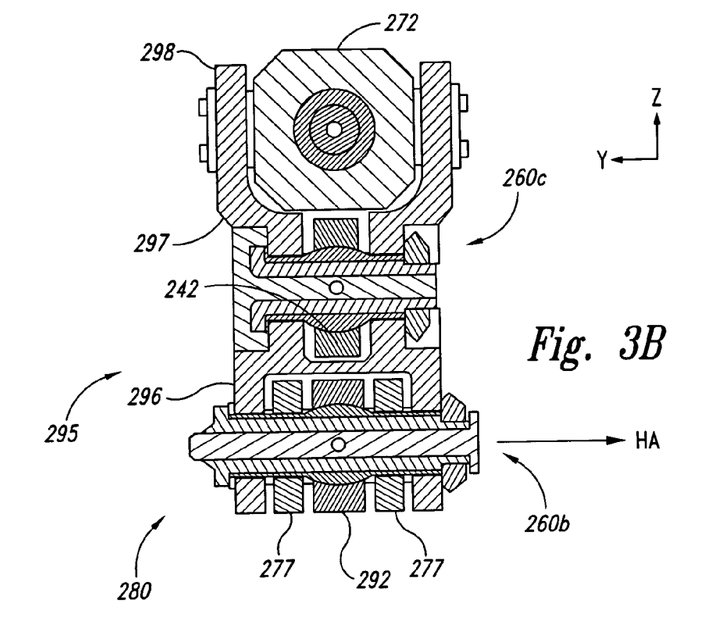
FIG. 3B is a partially schematic rear cross-sectional view of the portion of the aerospace vehicle system shown in FIG. 3A taken along line 3B-3B.
Figure 3C:
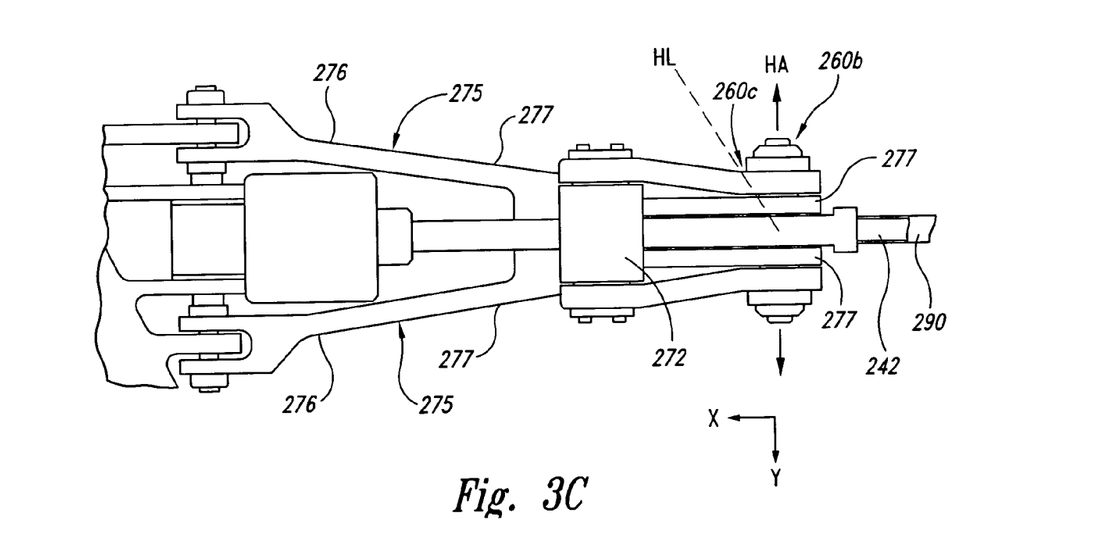
FIG. 3C is a partially schematic planform view of the portion of the aerospace vehicle system shown in FIG. 3A without a second flow body.
Figure 4:
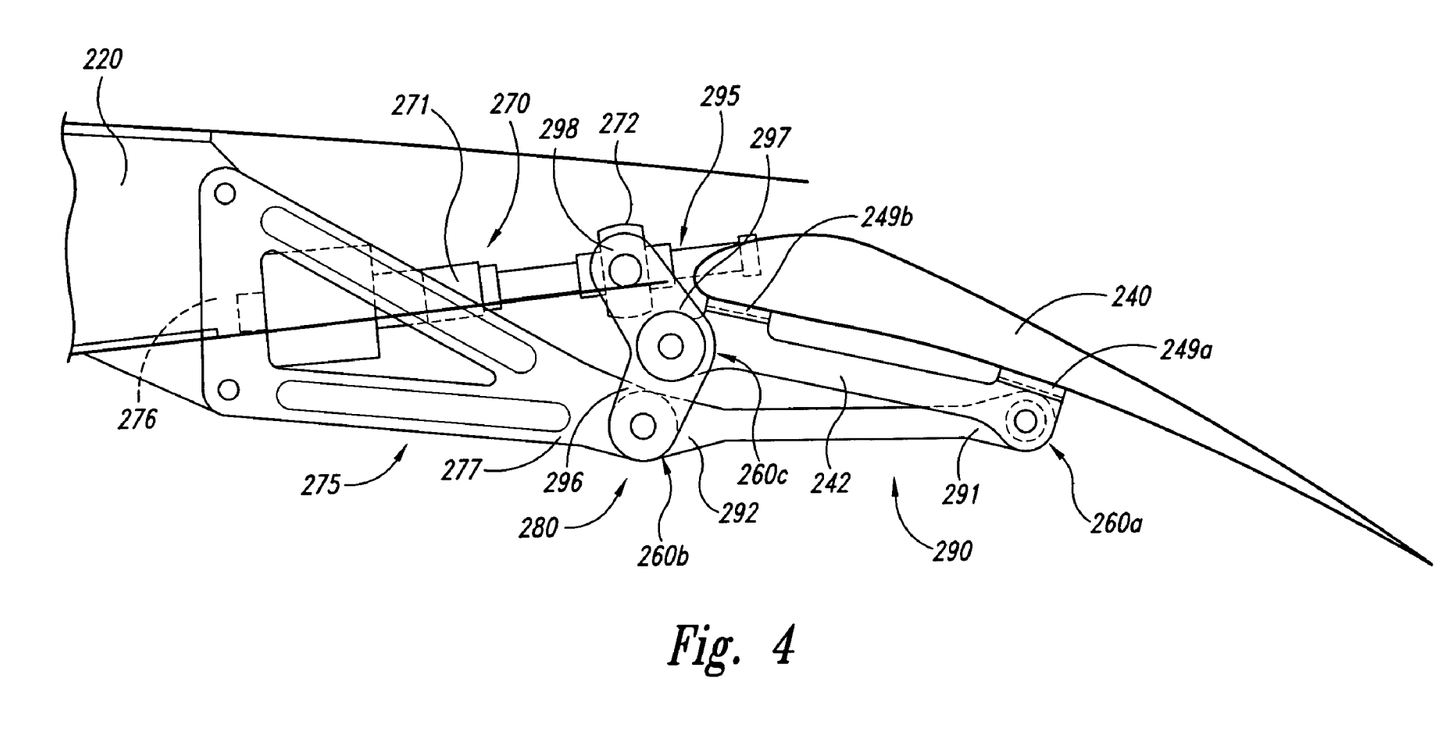
FIG. 4 is a partially schematic side cross-sectional view of a portion of the aerospace vehicle system shown in 3A with the second flow body in a second position.
Figure 5:
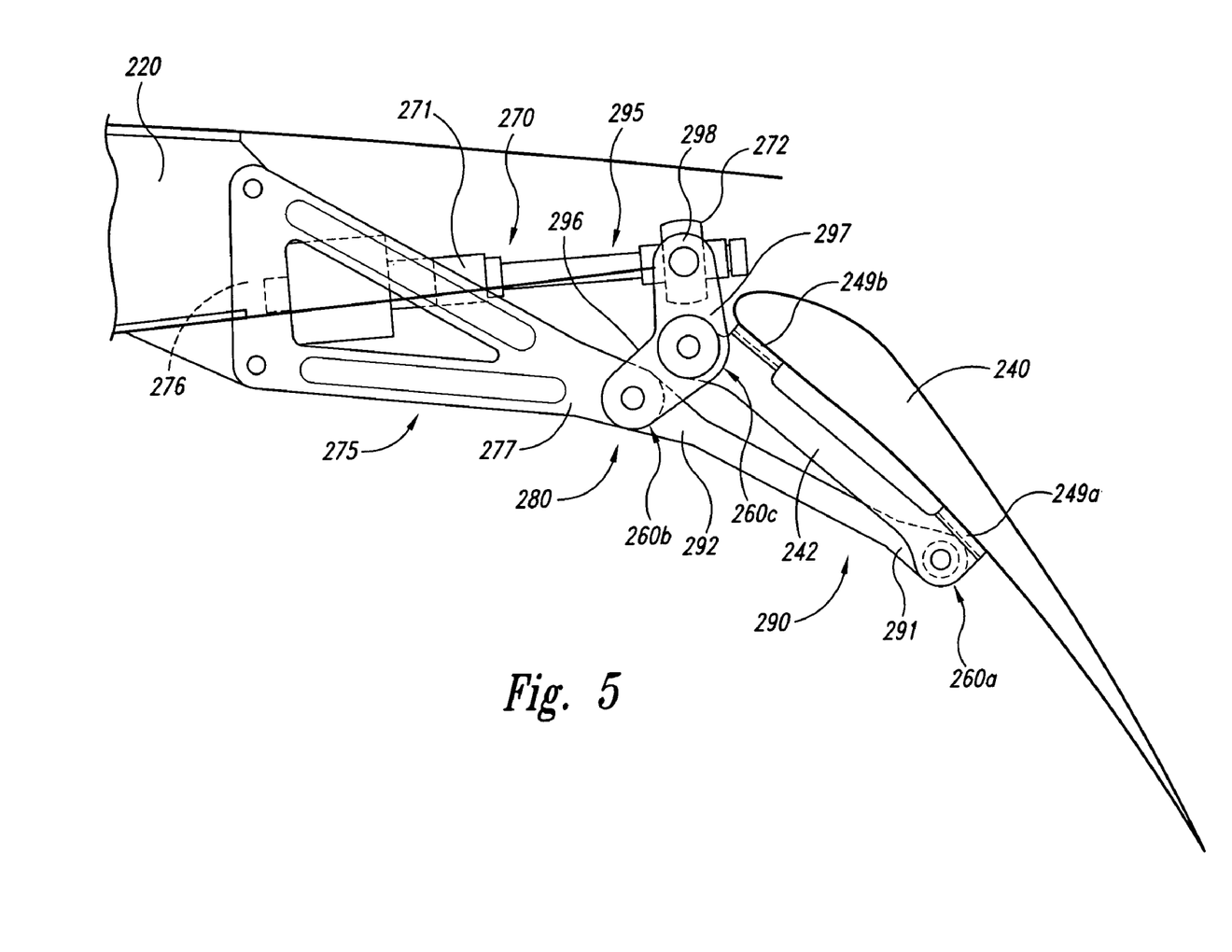
FIG. 5 is a partially schematic side cross-sectional view of a portion of the aerospace vehicle system shown in 3A with the second flow body in a third position.

FIG. 3A is a partially schematic side cross-sectional view of the first drive device 270a and the first portion 246 of the second flow body 240 of the aerospace vehicle system 210 shown in FIG. 2A-2B. FIG. 3B is a partially schematic rear cross-sectional view of the portion of the aerospace vehicle system 210 shown in FIG. 3A taken along line 3B-3B. FIG. 3C is a partially schematic planform view of the portion of the aerospace vehicle system 210 shown in FIG. 3A without a second flow body. In FIGS. 2A-2B the second drive device 270b and second portion 247 of the second flow body 240 are coupled to the first flow body 220 in a manner similar to the way the first drive device 270a and the first portion 247 of the second flow body 240 are coupled to the first flow body 220. Accordingly, for the purpose of illustration only, the arrangement of the first drive device 270a, the first portion 246 of the second flow body 240 and the first flow body 220 is discussed below.

In FIG. 3A a drive device 270 includes a first portion 271 and a second portion 272 that is movable relative to the first portion 271. In the illustrated embodiment, the first portion 271 of the drive device 270 is coupled to the first flow body 220 and the second portion 272 of the drive device 270 is coupled to the second flow body 240. In FIG. 3A, the drive device is positioned so that the first and second portions 271, 272 of the drive device move relative to one another in a plane having an axis that runs at least approximately parallel to the longitudinal axis X of the aerospace vehicle 200 when the first flow body 220 is coupled to the aerospace vehicle 200 (e.g., in a plane that is at least approximately parallel to a plane defined by the X-Z axis of the fuselage accepting small differences for dihedral effects).

In the illustrated embodiment, the second flow body 240 includes a chord line CL and can be coupled to the drive device 270 and the first flow body 220 via a support 275, a first link 290, a second link 295, and at least one self-aligning mechanism 260. In FIG. 3A, three self-aligning mechanisms 260 are shown as a first self-aligning mechanism 260a, a second self-aligning mechanism 260b, and a third self-aligning mechanisms 260c. The second flow body 240 is positioned to rotate relative to the first flow body 220 about a point away from (e.g., below) the chord line CL of the second flow body 240. Accordingly, as the second flow body 240 rotates, it also moves longitudinally with respect to the first flow body 220 providing a Fowler motion. In some embodiments, the Fowler motion creates a gap between the leading edge of the second flow body 240 and the trailing edge of the first flow body 220 as the second flow body 240 moves to selected positions (e.g., moves to an extended position).

In FIG. 3A, the support 275 can include a first portion 276 coupled to the airfoil and a second portion 277. The first link 290 can include a first portion 291 and second portion 292. The first portion of the first link 291 can be coupled to the second flow body 240 (e.g., a structural part 242 of the second flow body 240) via the first self-aligning mechanism 260a. The second link 295 can include a first portion 296, a second portion 297, and a third portion 298. The first portion 296 of the second link 295 can be coupled to the second portion 291 of the first link 290 and the second portion 277 of the support 275 via the second self-aligning mechanism 260b. In the illustrated embodiment, the second self-aligning mechanism 260b is positioned to create or form at least a portion of the first hinge point 280. The second portion 297 of the second link 295 can also be coupled to the second flow body 240 (e.g., the structural part 242 of the second flow body 240) via the third self-aligning mechanism 260c. The third portion 298 of the second link 295 can be coupled to the second portion 272 of the drive device 270.

As shown in FIGS. 3B and 3C, the self-aligning mechanism 260 can include any mechanism or device that allows the second flow body 240 to simultaneously rotate about the hinge axis HA and another non-parallel axis. For example, the self-aligning mechanism 260 can include a self-aligning joint, which is well known to those skilled in the art. In other embodiments, the self-aligning mechanism 260 can include other mechanisms or devices, for example, a mechanism or device that has multiple self-aligning joints. In the illustrated embodiment, the self-aligning mechanisms 260 allow components that are rotatably coupled to the self-aligning mechanism 260 to twist relative to the self-aligning mechanism while rotating about the intended or primary axis of rotation. For example, in the illustrated embodiment, the second self-aligning mechanism 260b can allow the first link 290 (shown in FIGS. 3A-3C) to twist (e.g., rotate about an axis that is generally parallel to the longitudinal axis X of the aerospace vehicle) while it rotates about the hinge axis HA. As discussed below in further detail, this feature of the self-aligning mechanisms 260 allows the second flow body 260 to rotate about the hinge axis HA and a non-parallel hinge line HL (as shown in FIG. 3C).

In FIG. 3B, the second self-aligning mechanism 260b forms at least a portion of the first hinge point 280 and is coupled to the second portion 277 of the support 275, the second portion 292 of the first link 290 (which is also coupled to the second flow body 240), and the first portion 296 of the second link 295. The third self-aligning mechanism 260c is coupled to the second portion 297 of the second link 295 and the second flow body 240 (e.g., coupled to the structural part 242 of the second flow body 240). Accordingly, as shown in FIGS. 3A and 3B, the second and third self-aligning mechanisms 260b, 260c allow the flap to move or rotate laterally relative to the second link 295, the drive device 270, the support 275, and the first flow body 220. For example, the trailing edge can move laterally or at least approximately perpendicular to the longitudinal axis X of the aerospace vehicle 200. Additionally, because the second flow body 240 is coupled to the first portion 291 of the first link 290 via the first self-aligning mechanism 260a and to the second portion 297 of the second link 295 via the third self-aligning mechanism 260c, the second flow body can twist or roll relative to the second link 295, the drive device 270, the support 275, and the first flow body 220. For example, the lateral edges of the second flow body 240 can move up and down, at least approximately in the Z direction.

As shown in FIG. 3C, these features allow the second flow body to rotate simultaneously about the hinge line HL and the hinge axis HA while moving between multiple positions. For example, the second flow body 240 is shown in a retracted or first position in FIGS. 3A-3C, a second position in FIG. 4, and a third position in FIG. 5. In other embodiments, the second flow body 240 can have more or fewer positions.

A feature of at least some of the embodiments discussed above is that a flap or other control surface coupled to a swept wing via a dropped hinge can move in a conical or somewhat conical manner. This feature can allow lateral clearances between the flap and other adjacent structures (e.g., wing section and/or other control surfaces) to be reduced. This reduction in clearance can create less drag when the flap is positioned in the retracted position. An advantage of this feature is that cruise fuel efficiency can be improved, resulting in reduced operating costs. Additionally, this feature can reduce the gap created between adjacent control surfaces, when adjacent control surfaces are deployed. For example, it can reduce the gap between a deployed flap having a swept hinge line and an adjacent deployed flap having an un-swept hinge line, thereby increasing aerodynamic efficiency. This increased aerodynamic efficiency can result in improved takeoff and landing performance. Furthermore, the dropped hinge flap can be a simple and reliable flap system as compared to more complex flap systems that attempt to provide a conical type motion when moving a flap. Accordingly, the dropped hinge flap system can be less expensive to produce and/or less expensive to maintain.

In other embodiments, the aerospace vehicle system 210 can have other arrangements. For example, in other embodiments the aerospace vehicle system can include more or fewer drive devices, drive devices having different motions, and/or drive devices having other arrangements (e.g., more or fewer portions). In still other embodiments, the second flow body 240 can have more or fewer portions and/or can be coupled to the first flow body at more or fewer locations, where some or all locations include at least one self-aligning mechanism. In yet other embodiments, the second flow body 240 can be coupled to the first flow body using other arrangements. For example, the second flow body 240 can be coupled to the first flow body 220 using more, fewer, or different supports, links, self-aligning mechanisms, and/or drive devices.

From the foregoing, it will be appreciated that specific embodiments of the invention have been described herein for purposes of illustration, but that various modifications may be made without deviating from the invention. Additionally, aspects of the invention described in the context of particular embodiments may be combined or eliminated in other embodiments. For example, although some of the above embodiments have been discussed with reference to a wing and flap combination, in other embodiments the aerospace vehicle system can include other flow bodies (e.g., a canard with a control device). Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

We claim:

1. An aerospace vehicle system, comprising:
    a first flow body coupleable to an aerospace vehicle;
    a second flow body having a first portion rigidly connected to a second portion, the second portion of the second flow body being laterally disposed from the first portion of the second flow body, the first portion having a first chord line and being rotatably coupled to the first flow body at a first hinge point positioned away from the first chord line, the first hinge point having a first hinge axis, the second portion having a second chord line and being rotatably coupled to the first flow body at a second hinge point positioned away from the second chord line, the second hinge point having a second hinge axis, the second flow body being rotatable about a hinge line between a stowed position and a deployed position, the hinge line being positioned to be swept relative to a longitudinal axis of the aerospace vehicle when the first flow body is coupled to the aerospace vehicle, the hinge line being nonparallel with the first hinge axis; and
    at least one self-aligning mechanism coupled between the first flow body and the second flow body at the first hinge point, the at least one self-aligning mechanism including a non-cylindrical interface between a first surface connected to the first flow body and a second surface connected to the second flow body, at least one of the first and second surfaces being rotatable relative to the other to allow the second flow body to rotate about the hinge line and the first and second hinge axes along a generally conical motion path between the stowed position and the deployed position.

2. The system of claim 1 wherein the first flow body includes an airfoil section, the second flow body includes a flap section, and the at least one self-aligning mechanism includes a first self-aligning mechanism, a second self-aligning mechanism, and a third self-aligning mechanism, and wherein the system further comprises:
    a drive device having a first portion and a second portion movable relative to the first portion of the drive device, the first portion of the drive device being coupled to the airfoil section and the second portion of the drive device being coupled to the flap section, the drive device being positioned so that the first and second portions of the drive device move relative to one another in a plane having an axis that runs at least approximately parallel to the longitudinal axis of the aerospace vehicle when the airfoil section is coupled to the aerospace vehicle;
    a support having a first portion coupled to the airfoil section and a second portion;
    a first link having a first portion and second portion, the first portion of the first link being coupled to the first portion of the flap section via the first self-aligning mechanism; and
    a second link having a first portion, a second portion, and a third portion, the first portion of the second link being coupled to the second portion of the first link and the second portion of the support via the second self-aligning mechanism, the second self-aligning mechanism being positioned to create at least a portion of the first hinge point, the second portion of the second link being coupled to the first portion of the flap section via the third self-aligning mechanism, the third portion of the second link being coupled to the second portion of the drive device.

3. The system of claim 1 wherein the first flow body includes an airfoil section, the second flow body includes a flap section, and the at least one self-aligning mechanism includes a first self-aligning mechanism, a second self-aligning mechanism, and a third self-aligning mechanism, and wherein the system further comprises:
    a drive device coupled between the airfoil section and the first portion of the flap section, the drive device being positioned to rotate the flap section relative to the airfoil section;
    a first link having a first portion and a second portion, the first portion of the first link being coupled to a first portion of the flap section via the first self-aligning mechanism; and
    a second link having a first portion and a second portion, the first portion of the second link being coupled to the second portion of the first link and to the airfoil section via the second self-aligning mechanism, the second portion of the second link being coupled to the first portion of the flap section via the third self-aligning mechanism, the second self-aligning mechanism being positioned to create at least a portion of the first hinge point.

4. The system of claim 1 wherein the first flow body is coupled to the aerospace vehicle.

5. The system of claim 1 wherein the hinge line is nonparallel with the second hinge axis.

6. The system of claim 1 wherein the first portion of the second flow body follows a first curvilinear path and the second portion of the second flow body follows a second curvilinear path as the second flow body is rotated between the stowed and deployed positions, the first curvilinear path being (a) longer than the second curvilinear path, and (b) having a different radius of curvature than the second curvilinear path.

7. The system of claim 1 wherein the at least one self-aligning mechanism includes at least one first self-aligning mechanism coupled between the first portion and the first flow body and at least one second self-aligning mechanism between the second portion and the first flow body.

8. The system of claim 1 wherein:
the first flow body includes a trailing edge with a cutout between a first edge of the first flow body and a second edge of the first flow body, the first edge of the first flow body being laterally disposed from the second edge of the first flow body;
the second flow body includes a first edge and a second edge laterally disposed from the first edge of the second flow body, the second flow body being positioned in the cutout of the first flow body with the first edge of the second flow body being spaced apart from the first edge of the first flow body by a first lateral distance and the second edge of the second flow body being spaced apart from the second edge of the first flow body by a second lateral distance, the first and second lateral distances remaining at least approximately unchanged as the second flow body rotates between the first and second positions.

9. An aerospace vehicle system, comprising:
a first flow body that includes a wing connected to an aerospace vehicle;
a second flow body that includes a flap having a chord line and being rotatably coupled to the first flow body at two hinge points positioned away from the chord line, each hinge point having a hinge axis, the second flow body being rotatable about a hinge line between a first position and a second position, the hinge line extending through the hinge points, but being nonparallel with the hinge axes; and
at least one self-aligning mechanism coupled between the first flow body and the second flow body at each of the two hinge points, the at least one self-aligning mechanism including a non-cylindrical interface between a first surface connected to the first flow body and a second surface connected to the second flow body, at least one of the first and second surfaces being rotatable relative to the other as the second flow body rotates about the hinge line and the hinge axes along a generally conical motion path between the first position and the second position.

10. The system of claim 9 wherein the at least one self-aligning mechanism includes a first self-aligning mechanism, a second self-aligning mechanism, and a third self-aligning mechanism, and wherein the system further comprises:
a drive device coupled between the wing and the flap, the drive device being positioned to rotate the flap between the first position and the second position;
a first link having a first portion and a second portion, the first portion of the first link being coupled to the flap via the first self-aligning mechanism; and
a second link having a first portion, and a second portion, the first portion of the second link being coupled to the second portion of the first link and to the wing via the second self-aligning mechanism, the second portion of the second link being coupled to the flap via the third self-aligning mechanism.

11. The system of claim 9 wherein the at least one self-aligning mechanism includes at least one self-aligning joint.

12. The system of claim 9 wherein the interface includes a generally spherical interface.

13. The system of claim 9, further comprising a drive device coupled between the first and second flow bodies to rotate the second flow body relative to the first flow body.

14. The system of claim 9 wherein:
the first flow body includes a trailing edge with a cutout between a first edge of the first flow body and a second edge of the first flow body, the first edge of the first flow body being laterally disposed from the second edge of the first flow body;
the second flow body includes a first edge and a second edge laterally disposed from the first edge of the second flow body, the second flow body being positioned in the cutout of the first flow body with the first edge of the second flow body being spaced apart from the first edge of the first flow body by a first lateral distance and the second edge of the second flow body being spaced apart from the second edge of the first flow body by a second lateral distance, the first and second lateral distances remaining at least approximately unchanged as the second flow body rotates between the first and second positions.

15. The system of claim 9 wherein the second flow body includes a first portion and a second portion laterally disposed from the first portion, the chord line includes a first chord line of the first portion, the hinge point includes a first hinge point, and the hinge axis includes a first hinge axis, the second portion having a second chord line and being rotatably coupled to the first flow body at a second hinge point positioned away from the second chord line, the hinge line extending through the second hinge point, the second hinge point having a second hinge axis that is nonparallel to the hinge line, and wherein the at least one self-aligning mechanism is positioned to allow the second flow body to rotate about the hinge line and the first and second hinge axes.

16. A method for making an aerospace vehicle system, comprising:
rotatably coupling a flap to a wing at two hinge points positioned away from a chord line of the flap, each hinge point having a hinge axis, the first flow body being coupleable to an aerospace vehicle; and
coupling at least one self-aligning mechanism between the wing and the flap so that the second flow body simultaneously rotates about a hinge line and the hinge axes as the flap moves between a first position and a second position, the hinge line extending through the hinge points, but being nonparallel with the hinge axes, the self-aligning mechanism including a non-cylindrical interface between a first surface connected to the wing and a second surface connected to the flap, at least one of the first and second surfaces being rotatable relative to the other as the flap moves relative to the wing along a generally conical motion path between the first and second positions.

17. The method of claim 16 wherein coupling at least one self-aligning mechanism includes:
coupling a first portion of a drive device to the wing;
coupling a first portion of a first link to the flap via a first self-aligning mechanism, the first link including a second portion;
coupling a first portion of a support to the wing;
coupling a first portion of a second link to a second portion of the support and to the second portion of the first link via a second self-aligning mechanism, the second self-aligning mechanism being positioned to create at least a portion of one of the hinge points, coupling a second portion of the second link to the flap via a third self-aligning mechanism; and coupling a third portion of the second link to a second portion of a drive device, the second portion of the drive device being movable relative to the first portion of the drive device in a plane having an axis that runs at least approximately parallel to the longitudinal axis of the aerospace vehicle when the wing is coupled to the aerospace vehicle, the drive device causing the flap to move between the first and second positions as the second portion of the drive device moves relative to the first portion.

18. The method of claim 16, further comprising coupling the wing to the aerospace vehicle.

19. The method of claim 16, further comprising coupling a drive device between the wing and the flap to move the flap relative to the wing.

20. The method of claim 16 wherein:

rotatably coupling the flap includes positioning the flap in a cutout of a trailing edge section of the wing between a first edge of the wing and a second edge of the wing, the first edge of the wing being laterally disposed from the second edge of the wing; a first edge of the flap being spaced apart from the first edge of the wing by a first lateral distance and a second edge of the flap being spaced apart from the second edge of the wing by a second lateral distance; and coupling at least one self-aligning mechanism includes coupling at least one self-aligning mechanism between the wing and the flap so that the first and second lateral distances remaining at least approximately unchanged as the second flow body moves between the first and second positions.

21. The method of claim 16 wherein: coupling the flap includes rotatably coupling a first portion of the flap to the wing at a first hinge point positioned away from a first chord line of the flap, the first hinge point having a first hinge axis, and rotatably coupling a second portion of the flap to the wing at a second hinge point positioned away from a second chord line of the flap, the second hinge point having a second hinge axis, the first portion of the flap being laterally disposed from the second portion of the flap; and coupling at least one self-aligning mechanism includes coupling at least one self-aligning mechanism between the wing and the flap so that the flap simultaneously rotates about the hinge line, the first hinge axis, and the second hinge axis as the flap moves between the first position and the second position, the hinge line extending through the first and second hinge points, but being nonparallel with the first and second hinge axes.

22. An aerospace vehicle system, comprising:

a first flow body connected to an aerospace vehicle, the first flow body including an airfoil section;

a second flow body that includes a flap section, the second flow body having a first portion rigidly connected to a second portion, the second portion of the second flow body being laterally disposed from the first portion of the second flow body, the first portion having a first chord line and being rotatably coupled to the first flow body at a first hinge point positioned away from the first chord line, the first hinge point having a first hinge axis, the second portion having a second chord line and being rotatably coupled to the first flow body at a second hinge point positioned away from the second chord line, the second hinge point having a second hinge axis, the second flow body being rotatable about a hinge line between a first position and a second position, the hinge line being positioned to be swept relative to a longitudinal axis of the aerospace vehicle when the first flow body is coupled to the aerospace vehicle, the hinge line being nonparallel with the first hinge axis;

first, second and third self-aligning mechanisms coupled between the first flow body and the second flow body, the self-aligning mechanisms being positioned to allow the second flow body to rotate about the hinge line and the first and second hinge axes;

a drive device having a first portion and a second portion movable relative to the first portion of the drive device, the first portion of the drive device being connected directly to the airfoil section and the second portion of the drive device being connected directly to the flap section, the drive device being positioned so that the first and second portions of the drive device move relative to one another in a plane having an axis that runs at least approximately parallel to the longitudinal axis of the aerospace vehicle when the airfoil section is coupled to the aerospace vehicle;

a support having a first portion coupled to the airfoil section and a second portion;

a first link having a first portion and second portion, the first portion of the first link being structurally coupled to the first portion of the flap section via only the first self-aligning mechanism; and a second link having a first portion, a second portion, and a third portion, the first portion of the second link being structurally coupled to the second portion of the first link and the second portion of the support via only the second self-aligning mechanism, the second self-aligning mechanism being positioned to create at least a portion of the first hinge point, the second portion of the second link being structurally coupled to the first portion of the flap section via only the third self-aligning mechanism, the third portion of the second link being coupled to the second portion of the drive device.

* * * * *